(12) United States Patent
Shiota et al.

(10) Patent No.: US 9,518,663 B2
(45) Date of Patent: Dec. 13, 2016

(54) ELECTROMAGNETIC VALVE

(71) Applicant: TGK CO., LTD., Tokyo (JP)

(72) Inventors: Toshiyuki Shiota, Tokyo (JP);
Toshihiro Andoh, Tokyo (JP); Shigeru Abe, Tokyo (JP)

(73) Assignee: TGK CO., LTD., Tokyo (JP)

( * ) Notice: Subject to any disclaimer, the term of this patent is extended or adjusted under 35 U.S.C. 154(b) by 83 days.

(21) Appl. No.: 14/483,126

(22) Filed: Sep. 10, 2014

(65) Prior Publication Data

US 2015/0083241 A1 Mar. 26, 2015

(30) Foreign Application Priority Data

Sep. 25, 2013 (JP) ................................. 2013-198855

(51) Int. Cl.
| | |
|---|---|
| *F16K 31/06* | (2006.01) |
| *F16K 1/34* | (2006.01) |
| *F16K 31/42* | (2006.01) |
| *F25B 41/04* | (2006.01) |

(52) U.S. Cl.
CPC ............. *F16K 1/34* (2013.01); *F16K 31/0627* (2013.01); *F16K 31/423* (2013.01); *F25B 41/04* (2013.01); *Y10T 137/7761* (2015.04)

(58) Field of Classification Search
CPC ....... F16K 1/34; F16K 31/0627; F16K 31/423
USPC ........................................... 251/30.03, 30.04
See application file for complete search history.

(56) References Cited

U.S. PATENT DOCUMENTS

| | | | | |
|---|---|---|---|---|
| RE25,338 | E | * | 2/1963 | Olson .................... F16K 31/408 251/30.04 |
| 3,542,333 | A | | 11/1970 | Stampfli ......................... 251/85 |
| 3,865,140 | A | * | 2/1975 | Greenwood ........ F15B 13/0405 137/625.64 |
| 4,283,040 | A | * | 8/1981 | Kolze .................... F16K 31/404 251/30.03 |

(Continued)

FOREIGN PATENT DOCUMENTS

| | | | | |
|---|---|---|---|---|
| EP | 1798456 A1 | 6/2007 | ............... | F16K 1/34 |
| EP | 2623827 A1 | 8/2013 | ............ | F16K 11/044 |

(Continued)

OTHER PUBLICATIONS

European Search Report, EP14185996, Feb. 17, 2015, The Hague.

*Primary Examiner* — Eric Keasel
(74) *Attorney, Agent, or Firm* — Martine Penilla Group, LLP

(57) ABSTRACT

A pilot valve element includes a metallic pilot valve body formed integrally with a plunger, a flexible sealing member, fitted on a tip of the pilot valve body, which touches and leaves a pilot valve seat, and a stopper for restricting the displacement of the pilot valve element relative to a driven member in a manner such that the sealing member is stopped in a direction of axis line after the sealing member has seated on a pilot valve seat. The stopper is configured such that the pressure-receiving diameter of the sealing member, which receives a pressure difference between an upstream side and a downstream side of the pilot valve, remains unchanged from when the sealing member comes in contact with the pilot valve seat until when the sealing member is stopped by the stopper with the result that the sealing member has completely seated on the pilot valve seat.

2 Claims, 10 Drawing Sheets

(56) References Cited

U.S. PATENT DOCUMENTS

| | | | | |
|---|---|---|---|---|
| 4,717,116 A | * | 1/1988 | Ishigaki | F16K 31/402 |
| | | | | 251/30.03 |
| 6,682,316 B1 | * | 1/2004 | Boke | B67D 7/36 |
| | | | | 251/30.04 |

FOREIGN PATENT DOCUMENTS

| | | | | |
|---|---|---|---|---|
| JP | 2001124440 A | 5/2001 | | F25B 41/04 |
| JP | 2001-124440 | 11/2001 | | F25B 41/04 |
| JP | 2011-214596 A | 10/2011 | | F16K 27/02 |

* cited by examiner

ELECTROMAGNETIC VALVE

CLAIM OF PRIORITY TO RELATED APPLICATION

The present application is claiming priority of Japanese Patent Application No. 2013-198855, filed on Sep. 25, 2013, the content of which is incorporated herein by reference.

BACKGROUND OF THE INVENTION

1. Field of the Invention

The present invention relates to a pilot operated electromagnetic valve.

2. Description of the Related Art

An automotive air conditioner is generally configured such that it includes a compressor, a condenser, an evaporator, and so forth arranged in a refrigerant circulation passage. Various types of control valves are provided for the purpose of, for example, switching the refrigerant circulation passages according to the operation state in such a refrigeration cycle and regulating the flow rate of refrigerant. A pilot operated electromagnetic valve capable of controlling the opening and closing of a large valve section using a relatively small electric power may be used as such the control valve (see Reference (1) in the following Related Art List, for instance).

Such an electromagnetic valve drives a small pilot valve element by a solenoid so as to open and close a pilot valve and then drives a large main valve element by a pressure difference regulated thereby so as to open and close a main valve. A piston is formed integrally with the main valve element, and a back pressure chamber is formed by this piston as a separated space inside a body. A leak passage through which to introduce the refrigerant into the back pressure chamber, and a pilot passage through which the refrigerant is led out from the back pressure chamber, are formed in the main valve element. And the opening and closing of the pilot valve opens and blocks the pilot passage, respectively. With this structure, the opening and closing of the main valve is controlled by varying the pressure of the back pressure chamber. The pressure of the back pressure chamber is regulated through a balance between the flow rate of refrigerant introduced into the back pressure chamber and the flow rate of refrigerant led out from the back pressure chamber.

2. Related Art List (1) Japanese Unexamined Patent Application Publication (Kokai) No. 2001-124440.

As one of such electromagnetic valves, there is available a valve where a flexible sealing member, such as rubber, is placed at a tip of the pilot valve element to ensure the sealing property of the pilot valve and where the pilot valve element touches and leaves a pilot valve seat provided in the main valve element. By employing such a configuration as described above, the sealing member is appropriately deformed and then adheres tightly to the pilot valve seat when the sealing member seats on the pilot valve seat. Thereby, excellent sealing property can be achieved. Nevertheless, the pilot valve element is formed integrally with a movable iron core of the solenoid and therefore such a deformation may adversely affects the stroke of the movable iron core. In other words, the stroke of the movable iron core varies depending on a deformation amount of the sealing member and therefore the magnetic gap between the movable iron core and a fixed iron core varies. This may adversely affect the control performances of the solenoid. In some cases, the movable iron core and the fixed iron core hit each other and this may possibly cause noise. Also, depending on the shape of the pilot valve seat, the pressure-receiving diameter of the sealing member changes as a result of a change in the stroke of the pilot valve element and then the balance between a pressure difference exerted, between an upstream side and a downstream side of the pilot valve element, and the suction force of the solenoid is lost. This may also adversely affect the control performances.

SUMMARY OF THE INVENTION

A purpose of the present invention is to stabilize the control characteristics in opening and closing a pilot generated electromagnetic valve while the sealing property of a pilot valve is kept.

In order to resolve the aforementioned problems, an electromagnetic valve is a pilot operated electromagnetic valve and it includes: a body having a lead-in port through which a fluid is led in, a lead-out port through which the fluid is led out, and a main passage joining the lead-in port to the lead-out port; a metallic driven member integrally formed with both a main valve element and a partition, wherein the main valve element opens and closes a main valve by touching and leaving a main valve seat provided in the main passage and wherein the partition separates the main passage from a back pressure chamber; a pilot valve element that opens and closes a pilot valve by touching and leaving a pilot valve seat, the pilot valve seat being provided in a sub-passage joining the lead-in port to the lead-out port with the back pressure chamber arranged between the lead-in port to the lead-out port; and a solenoid including a first iron core, which is displaced integrally with the pilot valve element in a direction of axis line, and a second iron core, which is disposed in a position axially opposite to the first iron core in the direction of axis line. A pilot passage is formed in such manner as to pass through the driven member; the pilot valve seat is provided at one end side of the pilot passage such that the pilot valve seat protrudes toward the back pressure chamber; and the other end of the pilot passage communicates with the lead-out port. And the pilot valve element includes: a metallic pilot valve body formed integrally with the first iron core; a flexible sealing member, fitted on a tip of the pilot valve body, which touches and leaves the pilot valve seat; and a stopper for restricting a displacement of the pilot valve element relative to the driven member in a manner such that the stopper is stopped in the direction of axis line after the sealing member has seated on the pilot valve seat. The stopper is configured such that a pressure-receiving diameter of the sealing member, which receives a pressure difference between an upstream side and a downstream side of the pilot valve, remains unchanged from when the sealing member comes in contact with the pilot valve seat until when the sealing member has completely seated on the pilot valve seat with the result that the stopper is stopped by the driven member.

By employing this embodiment, when the pilot valve element seats on the pilot valve seat, the sealing member gets deformed and thereby the excellent sealing property remains in effect. Also, the stopper is stopped after the sealing member has seated on the pilot valve seat, thereby restricting the displacement of the pilot valve element. Thus, the magnetic gap of the solenoid can be kept constant. Also, the pressure-receiving diameter while the pilot valve element is seating is constantly kept at a fixed diameter. This can prevent the first iron core and the second iron core from hitting each other and therefore prevents the noise that may otherwise occur in the event that the first iron core and the second iron core hit each other. Also, the control performances by the solenoid are stabilized.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

The present invention will now be described in detail based on preferred embodiments with reference to the accompanying drawings. In the following description, for convenience of description, the positional relationship in each structure may be expressed with reference to how each structure is depicted in Figures. The present embodiment is a constructive reduction to practice of the present invention where a control valve according to the preferred embodiments is used as an electromagnetic valve applied to an air conditioner of an electric-powered vehicle. The automotive air conditioner is provided with a refrigeration cycle wherein a compressor, an internal condenser, an external heat exchanger, an evaporator, and an accumulator are connected to each other by piping. The automotive air conditioner is configured as a heat pump type air conditioner that performs air conditioning inside a vehicle's passenger compartment using the heat of refrigerant in a process where the refrigerant, which is used as a working fluid, circulates within the refrigeration cycle while the refrigerant changes its state. The automotive air conditioner operates in such a manner as to switch a plurality of refrigerant circulation passages at the time of cooling and heating. The control valve according to the present embodiment is provided at a branch point of these refrigerant circulation passages and is configured as a three-way valve that switches the flows of refrigerant.

Figure 1:
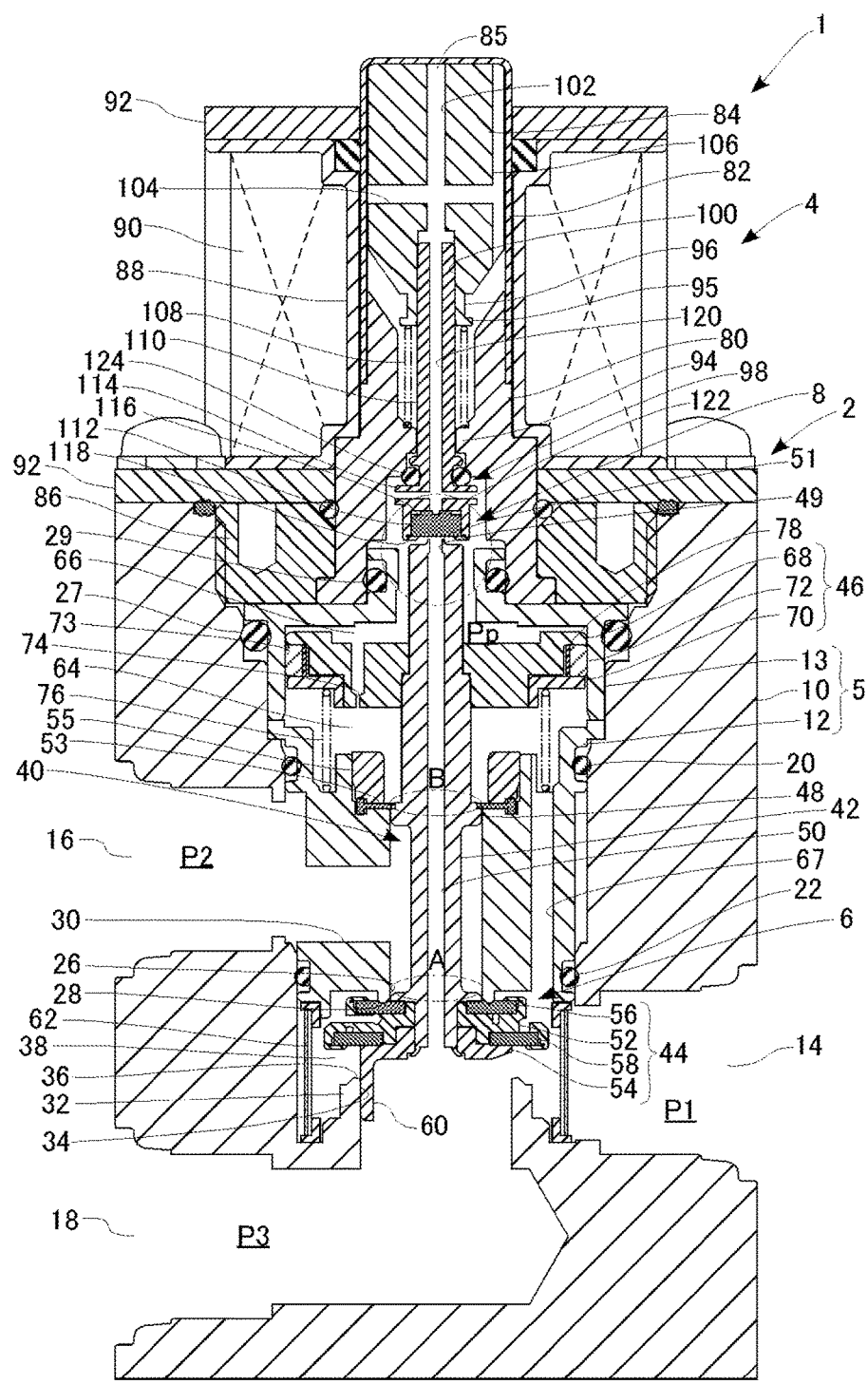
FIG. 1 is a cross-sectional view showing a concrete structure of an electromagnetic valve according to an embodiment.

A description is now given of a concrete structure of the control valve according to the present embodiment. FIG. 1 is a cross-sectional view showing a concrete structure of an electromagnetic valve according to an embodiment.

A control valve 1, which is a so-called pilot operated electromagnetic valve, is configured by assembling a valve unit 2 and a solenoid 4 in a direction of axis line. A main valve 6 and a pilot valve 8 are built into a body 5 of the valve unit 2. Here, the main valve 6 switches the flow of refrigerant from an upstream passage to either a first downstream passage or a second downstream passage, and the pilot valve 8 controls the opening and closing of the main valve 6.

The body 5 is configured such that a second body 12 of stepped cylindrical shape and a third body 13 of stepped cylindrical shape are assembled inside a first body 10, which is a prismatic column in shape. In the present embodiment, the first body 10 and the second body 12 are each made of an aluminum alloy, and the third body 13 is made of stainless steel (SUS). A lead-in port 14 leading to the upstream passage is provided on one of side surfaces of the first body 10. A lead-out port 16 (corresponding to "first lead-out port") leading to the first downstream passage is provided on an upper portion of a side opposite to said one of side surfaces of the first body 10, whereas a lead-out port 18 (corresponding to "second lead-out port") leading to the second downstream passage is provided on a lower portion thereof.

The second body 12 has a stepped cylindrical body with the diameter reduced toward the bottom, and the second body 12 is coaxially held by the first body 10. An O-ring 20 is fitted on the outer periphery of an upper end of the second body 12, and an O-ring 22 is fitted on the outer periphery of a lower end thereof. Provision of the O-ring 20 and the O-ring 22 prevents the refrigerant from being leaked through a gap in between the first body 10 and the second body 12. A valve hole 26 (corresponding to "first valve hole") is formed in the lower end of the second body 12, and a valve seat 28 (corresponding to "first valve seat") is formed in a lower end opening of the valve hole 26. A communication hole 30, which communicates to and from the second body 12, is formed in a surface facing the lead-out port 16 of the second body 12. A first passage (corresponding to "first main passage") joining the upstream passage to the first downstream passage is formed by an internal passage that connects the lead-in port 14, the valve hole 26 and the lead-out port 16.

The third body 13 of stepped cylindrical shape is held in an upper portion of the first body 10. An O-ring 27 is set between an upper end of the first body 10 and the third body 13. Provision of the O-ring 27 prevents the refrigerant from being leaked through a gap in between the first body 10 and the third body 13. The diameter of the third body 13 in an upper half thereof is reduced, and a reduced diameter portion thereof functions as a connection area where the solenoid 4 and the third body 13 are connected. An O-ring 29 is fitted on the outer periphery of an upper end of the third body 13.

A valve seat forming section 32 having a circular boss shape is provided in a communicating area, where the lead-in port 14 and the lead-out port 18 meet and communicate with each other, in the first body 10. The valve seat forming section 32 protrudes on a second body 12 side, and a valve hole 34 (corresponding to "second valve hole") is formed in a space inward from the valve seat forming section 32. A valve seat 36 (corresponding to "second valve seat") is formed by an upper-end opening edge of the valve seat forming section 32. A second passage (corresponding to "second main passage") joining the upstream passage to the second downstream passage is formed by an internal passage that connects the lead-in port 14, the valve hole 34 and the lead-out port 18. The valve hole 26 and the valve hole 34 are provided in the coaxial direction, and a valve chamber 38 is formed between the valve hole 26 and the valve hole 34.

A driven member 40 is disposed inside the body 5. The driven member 40 is comprised of a cylindrical body 42, a valve element 44 integrally formed with the body 42 at a lower end of the body 42, a piston 46 formed integrally with body 42 at an upper portion thereof, and a partition member 48. Here, the cylindrical body 42 extends along a central portion of the body 5 in the direction of axis line, and the partition member 48 is provided in a middle part of the body 42 in the direction of axis line such a manner as to protrude radially outward. In the present embodiment, the body 42 is made of an aluminum alloy. The body 42 is so provided as to penetrate the second body 12. A pilot passage 50 is so provided as to run through the body 42 in the direction of axis line. A pilot valve hole 49 is formed such that the inside diameter of an upper end of the body 42 is slightly reduced, and a pilot valve seat 51 is formed on an upper end opening of the pilot valve hole 49.

The valve element 44 includes a support member 52 and a guide member 54, which are inserted around and secured to the lower end of the body 42, a packing material 56 (which functions as "first sealing member") supported by a top face of the support member 52, and a packing material 58 (which functions as "second sealing member") supported by a bottom face of the support member 52. In the present embodiment, the support member 52 and the guide member 54 are each made of stainless steel (SUS). The packing materials 56 and 58 are each formed of a ring-shaped elastic body (e.g., rubber in the present embodiment). The valve element 44, which is displaceable within the valve chamber 38, closes and opens a first valve section when the packing material 56 touches and leaves the valve seat 28, respectively. Similarly, the valve element 44 closes and opens a second valve section when the packing material 58 touches and leaves the valve seat 36, respectively. Note that the valve element 44 is provided with fall prevention structures, which are used to prevent the packing materials 56 and 58 from falling off. A detailed description of the fall prevention structures will be discussed later.

The guide member 54 has a disk-shaped body, which supports the support member 52 from below, and a plurality of legs 60 (only one of these legs shown in FIG. 1), which extend downward from a peripheral edge part of this disk-shaped body. And the guide member 54 is slidably supported by and along an inner circumferential surface of the valve hole 34. A cylindrical strainer 62 is provided in the valve chamber 38 in such a manner as to surround the valve element 44 from outside. The strainer 62 includes a filter that suppresses foreign materials from entering the valve chamber 38.

A piston 46 functions as a "partition member" by which a space surrounded by the second body 12 and the third body 13 is partitioned into a high-pressure chamber 64 and a back pressure chamber 66. The high-pressure chamber 64 communicates with the lead-in port 14 by way of a communicating path 67. The back pressure chamber 66 communicates with the inside of the solenoid 4. A "sub-passage" is constituted by a passage that communicates the lead-in port 14 to the lead-out port 18 by way of the communicating path 67, the high-pressure chamber 64, the back pressure chamber 66 and the pilot passage 50. The piston 46 is slidably supported by and along a guiding passage 73, which is formed in an inner circumferential surface of the third body 13. The driven member 40 is configured such that a piston ring 72 and the legs 60 are slidably supported by and along an inner circumferential surface of the body 5. This configuration allows the driven member 40 to operate in a stabilized manner in the opening and closing directions of the valve section.

The piston 46 is configured such that the piston 46 is divided, along the direction of axis line, into a piston body 68 and a support 70 and such that the piston ring 72 is held between the piston body 68 and the support 70. In the present embodiment, the piston body 68 and the support 70 are each made of an aluminum alloy, and the piston ring 72 is formed of polytetrafluoroethylene (PTFE). The piston body 68 is of stepped disk shape such that the diameter thereof is reduced in stages toward the bottom. And the piston body 68 is secured such that the piston body 68 is coaxially press-fitted to an upper portion of the body 42. A leakage passage 74, having a small diameter, through which the high-pressure chamber 64 and the back pressure chamber 66 communicate with each other is formed in the piston body 68. A flange portion, which extends radially outward and abuts against a top face of the piston ring 72, is provided at an upper end of the piston body 68.

The support 70, which is of stepped annular shape, is fitted to a lower half of a smaller-diameter part of the piston body 68 in such a manner as to be inserted around the lower half thereof. A flange portion, which extends radially outward and abuts against a bottom face of the piston ring 72, is provided at an upper end of the support 70. A spring 76, which biases the piston 46 in an upward direction, is set between the support 70 and the second body 12. The spring 76 functions as a "biasing member" that biases the support 70 in a direction in which the support 70 is brought close to the piston body 68. The outside diameter of each of the flange portions of the piston body 68 and the support 70 is slightly smaller than the inside diameter of the guiding passage 73.

The piston ring 72 is assembled between the piston body 68 and the support 70 in a manner such that the piston ring 72 is fitted into a recess formed by the piston body 68 and the support 70. A tension ring 78 is set between an outer circumferential surface of the piston body 68 and an inner circumferential surface of the piston ring 72. The tension ring 78, which is formed of a spring steel, biases the piston ring 72 radially outward from the inside of the piston ring 72. Thereby, the piston ring 72 is pressed against the guiding passage 73 so as to obtain an appropriate sliding resistance. In other words, the piston 46 is slidably supported by and along the guiding passage 73 at the position of the piston ring 72. Though, in the present embodiment, the sealing property is improved using a specially assembled structure, its detailed description will be given later.

A pressure-receiving regulation member 53 is provided in an upper end opening of the second body 12. The pressure-receiving regulation member 53 regulates an effective pressure-receiving area of the partition member 48 such that when the first valve section is closed, the pressure-receiving regulation member 53 attaches firmly to the partition member 48. The pressure-receiving regulation member 53 is formed of a ring-shaped thin elastic body (e.g., rubber). A stopper ring 55 is press-fitted to an upper end of the second body 12. The pressure-receiving regulation member 53 is supported such that a thick-walled part in the outer periphery thereof is held between the second body 12 and the stopper ring 55.

The solenoid 4 has a stepped cylindrical core 80 (fixed iron core), which is assembled to the third body 13 on an upper end thereof, and a bottomed cylindrical sleeve 82, which is so assembled as to contain an upper portion of the core 80. Assembling the sleeve 82, which is nonmagnetic to the core 80, constructs a can for closing an internal pressure chamber. A cylindrical plunger 84 (movable iron core) is contained in the sleeve 82. A plunger 84 is disposed within the sleeve 82 in a position axially opposite to the core 80 in the direction of axis line. A back pressure chamber 85 is formed between the bottom of the sleeve 82 and the plunger 84.

A ring-shaped fixed member 86 is fastened in an upper end opening of the first body 10. Thereby, the core 80 is secured relative to the third body 13. In other words, a flange portion, which protrudes radially outward, is provided at a lower end of the core 80, and a fitting recess, which has a shape that is complementary to the shape of the flange portion, is formed at a lower end of the fixed member 86. Also, the fixed member 86 has an external thread on an outer periphery thereof, and an internal thread is formed in an upper end opening of the first body 10. Thus, the core 80 can be stably secured when the fixed member 86 is screwed to the first body 10 while a lower end of the core 80 is being inserted around the upper end of the third body 13. The O-ring 29 is set between the core 80 and the third body 13, and provision of the O-ring 29 prevents the refrigerant from being leaked through a gap in therebetween.

A bobbin 88 is provided on an outer periphery of the sleeve 82, and an electromagnetic coil 90 is wound around the bobbin 88. A pair of end members 92 are so provided as to hold the electromagnetic coil 90 from top and bottom thereof. The end members 92 also function as a yoke that constitutes a magnetic circuit. The can penetrates the pair of end members 92 in the direction of axis line. A current carrying harness (not shown) is led out from the electromagnetic coil 90.

A guide member 94, which protrudes radially inward, is provided in a central part of the core 80 in the direction of axis line. A tapered surface, where the inside diameter of the core 80 is larger upward, is formed at an upper end of the core 80. Also, a tapered surface where the outside diameter of the plunger 84 is smaller downward, is formed at a lower end of the plunger 84. A small-diameter part 95, which is inserted to and removed from the core 80, is provided in a lower-end center part of the plunger 84. In other words, the surface of the plunger 84 facing the core 80 and the surface of the core 80 facing the plunger 84 are the tapered surfaces each having a shape complementary to that of the other. Moreover, the arrangement is such that a part of the plunger 84 can be inserted to and removed from the core 80. Thus, a large stroke of the plunger 84 is secured and, at the same time, a sufficient magnetic attractive force is obtained. Also, a relatively large recessed groove 96 is formed on an outer circumferential surface of the small-diameter part 95, thereby in habiting the magnetic leakage of the plunger 84 and the core 80 in a radial direction. By employing such configuration and arrangement as described above, the suction force produced by the solenoid 4 is obtained efficiently and stably.

A fitting hole 100 used to couple a pilot valve element 98 is formed in a lower half of the plunger 84. Also formed are a communicating path 102, which runs through the plunger 84 in the direction of axis line, a communicating path 104, which runs through the plunger 84 in a radial direction, and a communicating groove 106 in parallel with the axis line along an outer circumferential surface of the plunger 84. The communicating paths 102 and 104, the communicating groove 106 and the fitting hole 100 communicate with one another. By employing such structure and arrangement as described above, a state of communication between a space, between the core 80 and the plunger 84, and the back pressure chamber 85 is maintained. Set between the core 80 and the plunger 84 is a spring 108 (functioning as a "biasing member") that biases the core 80 in such a direction as to separate the core 80 away from the plunger 84.

The pilot valve element 98 has a body 110 of stepped cylindrical shape, and a sealing member 112 is fixed to a lower end of the body 110. An upper end of the body 110 is press-fitted to the lower end of the plunger 84 and thereby the pilot valve element 98 and the plunger 84 are coaxially integrated with each other. The body 110 penetrates the guide member 94 of the core 80. A lower end part of the body 110 is a valve formation part 114 having a slightly large diameter, and this valve formation part 114 is located in the back pressure chamber 66. A recessed fitting space 116 is formed at a lower end of the valve formation part 114, and a disk-shaped sealing member 112 is fitted there. In the present embodiment, the body 110 is made of stainless steel (SUS) and the sealing member 112 is made of rubber. The sealing member 112 is immovably supported such that the lower end of the valve formation part 114 is swaged inward. The pilot valve 8 is closed and opened when the sealing member 112 of the pilot valve element 98 touches and leaves the pilot valve seat 51, respectively. A caulking part of the valve formation part 114, where the lower end thereof is swaged inward, constitutes a stopper 118, which is stopped by an upper end of the driven member 40. A detailed description of the stopper 118 will be given later.

Formed in the body 110 are a communicating path 120, which runs over an area starting from an upper end of the body 110 up to the fitting space 116 in the direction of axis line, and a communicating path 122, which runs through the valve formation part 114 in the radial direction. The communicating path 120 and the communicating path 122 communicate with each other inside the valve formation part 114. By employing such structure and arrangement as described above, the internal space of the solenoid 4 (i.e., a space, between the core 80 and the plunger 84, and the back pressure chamber 85) and the back pressure chamber 66 communicate with each other. In other words, the pressure of the back pressure chamber 66 is stably supplied to the internal space of the solenoid 4.

An O-ring 124 is fitted to an upper portion of the valve formation part 114. The O-ring 124 functions as a "shock-absorbing member". That is, as the conduction state (on/off state) of the solenoid 4 is switched from the conducting state to the nonconducting state (from on to off), the plunger 84 is displaced in the upward direction along the direction of axis line as shown in FIG. 1. However, the displacement of the plunger 84 is restricted when the core 80 stops the O-ring 124. The O-ring 124, which functions as the shock-absorbing member, deforms when the O-ring 124 is stopped by the core 80, thereby absorbing the shock. As a result, the occurrence of hitting sound is suppressed as compared with the case when the plunger 84 is directly stopped by the sleeve 82 on the bottom face thereof.

Also, such the shock-absorbing member is provided in the pilot valve element 98, that is, the shock-absorbing member is not provided in any of the components of the solenoid 4, such as the core 80, the sleeve 82 and the plunger 84. This can prevent the shock-absorbing member from being thermally deformed and prevent the physical property thereof from being altered. In other words, the core 80 and the sleeve 82 are assembled together such that the core 80 and the sleeve 82 are welded together while the plunger 84 is being contained inside the sleeve 82; as a result, the shock-absorbing member may possibly be deformed under the influence of the welding heat if the shock-absorbing member is provided in any of the core 80, the sleeve 82 and the plunger 84. In consideration of the above fact, the shock-absorbing member is provided in the pilot valve element 98, in the present embodiment. Hence, the incident of the shock-absorbing member being deformed and the like can be avoided. The pilot valve element 98 can be press-fitted to the sleeve 82 after the welding of the core 80 and the sleeve 82 has been completed.

In the above-described structure and arrangement, an upstream-side pressure P1 introduced from the lead-in port 14 (hereinafter referred to as "upstream-side pressure P1") becomes a pressure P2 (hereinafter referred to as "downstream-side pressure P2") by passing through the main valve 6 in the first passage. At the same time, the upstream-side pressure P1 becomes a pressure P3 (hereinafter referred to as "downstream-side pressure P3") by passing through the main valve 6 in the second passage. Also, the upstream-side pressure P1 is led into the high-pressure chamber 64 after passing through the communicating path 67, then becomes an intermediate pressure Pp at the back pressure chamber 66 by passing through the leakage passage 74, and further becomes the downstream-side pressure P3 by passing through the pilot valve 8.

According to the present embodiment, an effective pressure-receiving diameter A (seal section diameter) of the valve hole 26 and an effective pressure-receiving diameter B (seal section diameter) of the partition member 48 are set equal to each other. Thus, the effect of the downstream-side pressure P2 acting on the driven member 40 is cancelled. In particular, provision of the pressure-receiving regulation member 53 strictly achieves the cancellation of the effect of the downstream-side pressure P2 acting thereon. In other words, when the first valve section is closed as shown in FIG. 1, a bottom face of the pressure-receiving regulation member 53 and a top face of the partition member 48 attach firmly to each other. This achieves the accurate pressure cancellation.

Figure 2:
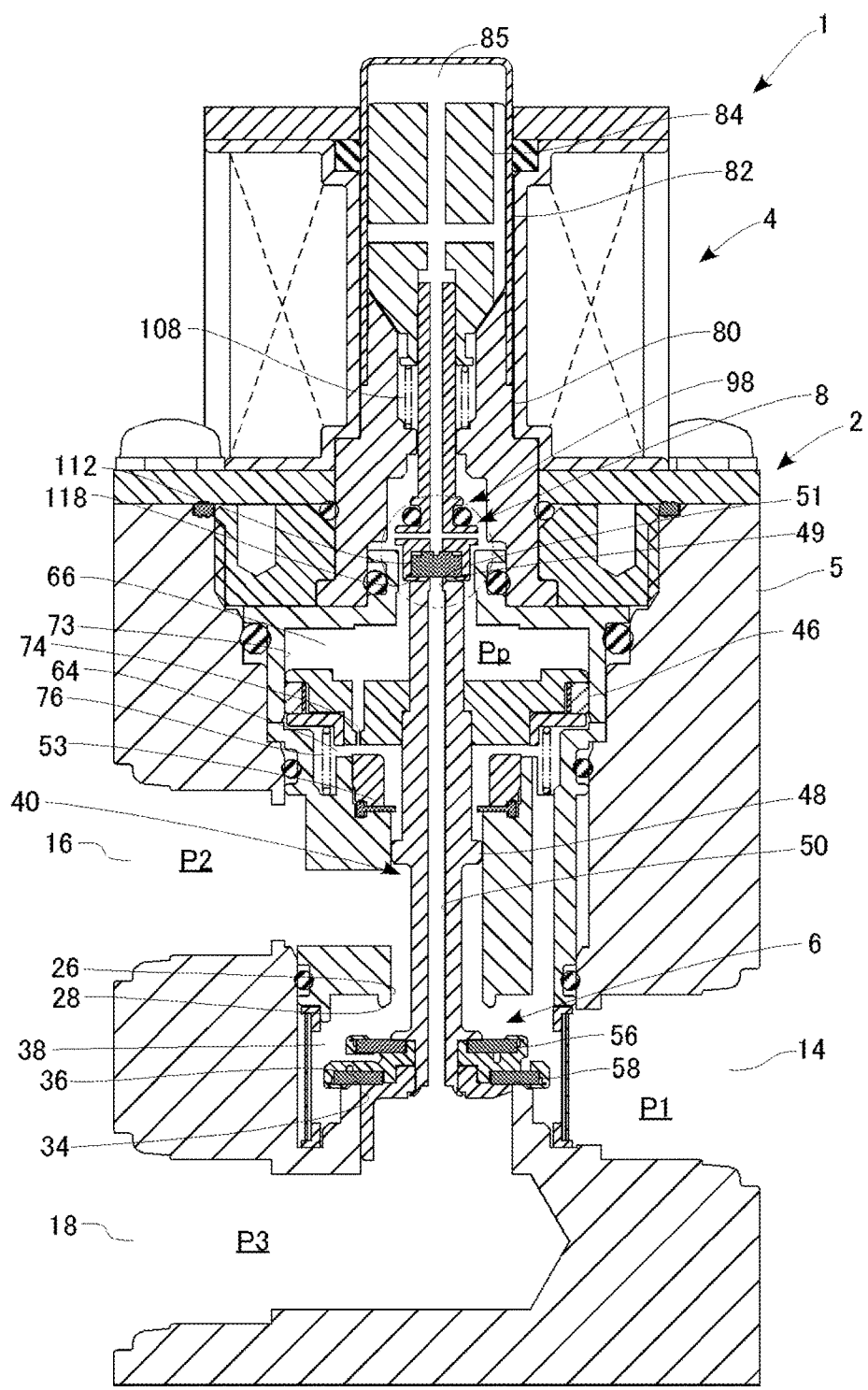
FIG. 2 is a diagram for explaining an operating state of a control valve.

The control valve 1 configured as described above functions as a pilot operated control valve that switches the flow passages of refrigerant, depending on the conduction state of the solenoid 4. An operation of the control valve 1 is hereinbelow described in detail. FIG. 2 is a diagram for explaining an operating state of a control valve 1. FIG. 2 represents a conducting state where the solenoid 4 is turned on. Note that the already-explained FIG. 1 represents a nonconducting state where the solenoid 4 is turned off.

Since, as shown in FIG. 1, the solenoidal force does not work while the solenoid 4 is turned off, the pilot valve element 98 is biased, by the spring 108, in a valve opening direction and therefore the pilot valve 8 is open. At this time, the refrigerant at the back pressure chamber 66 is led out to a downstream side through the pilot passage 50 and therefore the intermediate pressure Pp drops. Hence, the driven member 40 is biased, in an upward direction, by a pressure difference (P1−Pp) between the upstream-side pressure P1 and the intermediate pressure Pp. Thereby, the first valve section of the main valve 6 is closed and the second valve thereof is opened. As a result, the second passage is opened as shown in FIG. 1, thus achieving the closed state of the first passage. In other words, the refrigerant introduced from the lead-in port 14 is led out from the lead-out port 18.

When, on the other hand, the solenoid 4 is turned on, the suction force is created by the solenoidal force in between the plunger 84 and the core 80, as shown in FIG. 2. Thus, the pilot valve element 98 is biased in a valve closing direction and then the pilot valve 8 is closed. Since, at this time, the refrigerant fed from the upstream side is led into the back pressure chamber 66 through the leakage passage 74, the intermediate pressure Pp becomes the upstream-side pressure P1. At this time, the pressure of the refrigerant acting on the driven member 40 has already been canceled out and therefore the driven member 40 is smoothly driven by the solenoidal force. As a result, the first valve section of the main valve 6 is quickly opened and the second valve section thereof is closed. In other words, as shown in FIG. 2, the opening of the first passage achieves the closing of the second passage and, as a result, the refrigerant introduced from the lead-in port 14 is led out from the lead-out port 16.

A detailed description is now given of characteristic and distinctive structures and operations of the control valve 1.

Figure 3:
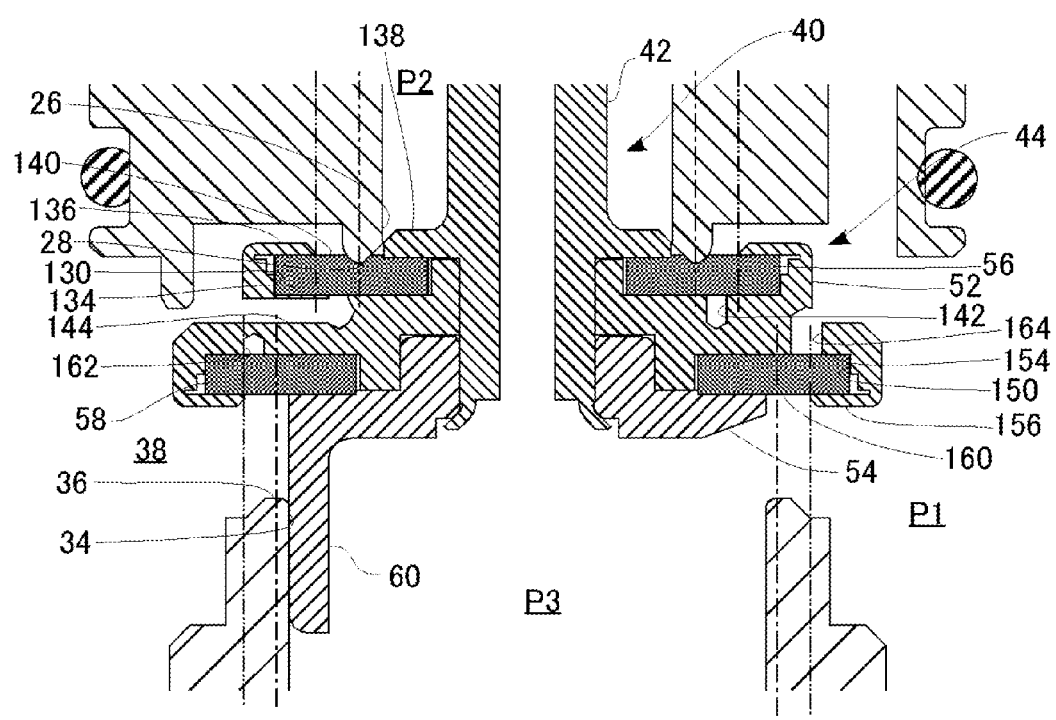
FIG. 3 is a partially enlarged view showing a fall prevention structure of a sealing member in a valve element.
Figure 4:
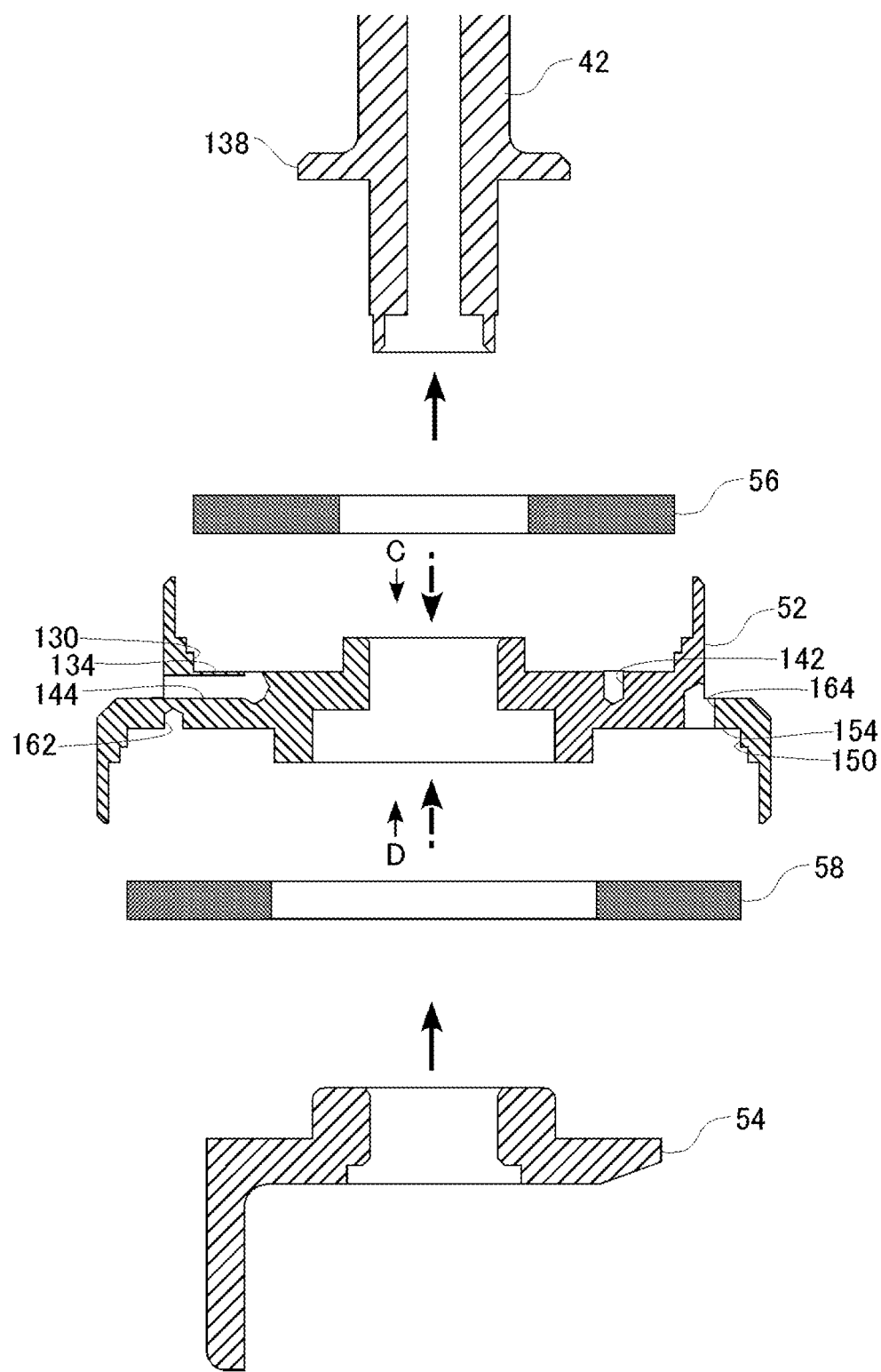
FIG. 4 schematically shows a process of assembling a sealing member.
Figure 5A:
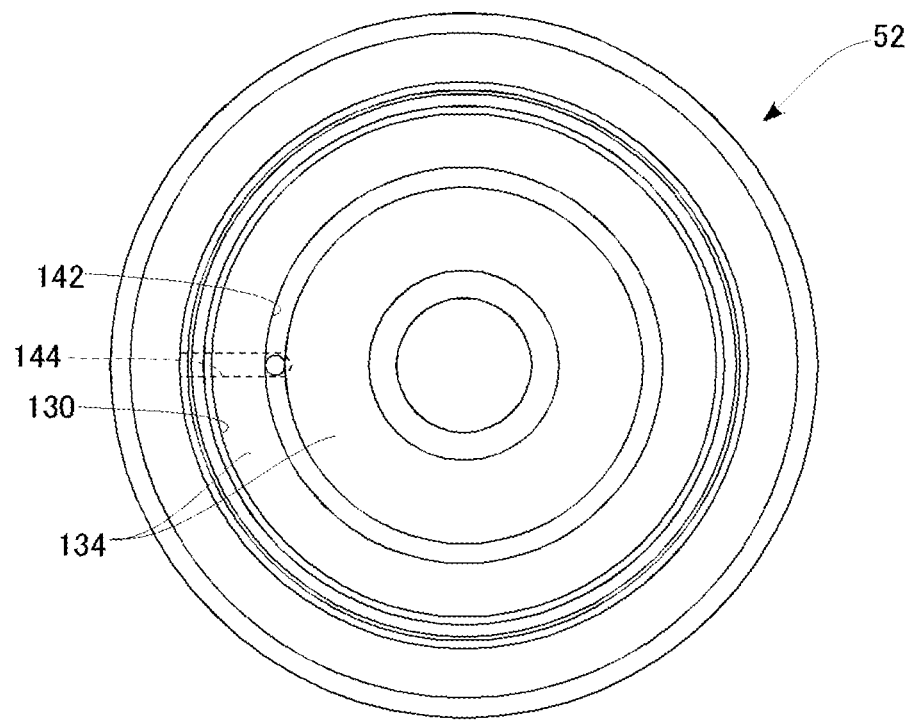
FIGS. 5A and 5B each shows a structure of a support member before the support member is assembled.
Figure 5B:
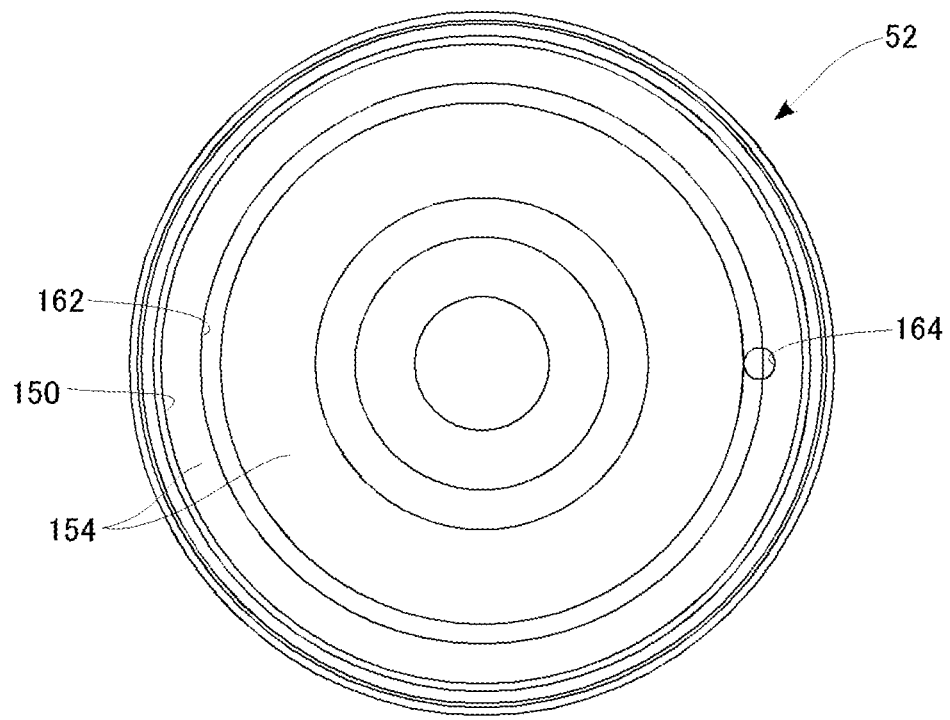

FIG. 3 is a partially enlarged view showing a fall prevention structure of a sealing member in a valve element. FIG. 4 schematically shows a process of assembling a sealing member. FIGS. 5A and 5B each shows a structure of a support member before the support member is assembled. FIG. 5A shows a support member viewed in a direction of arrow C of FIG. 4, and FIG. 5B shows a support member viewed in a direction of arrow D of FIG. 4.

As shown in FIG. 3, the support member 52 is of stepped disk shape such that the outside diameter of an upper half thereof is smaller than the outside diameter of a lower half thereof. As shown in FIG. 5A, an annular recess 130, into which the packing material 56 is fitted, is formed on the top face of the support member 52. The packing material 56 has an annular shape that is substantially complementary to the shape of the recess 130, and is assembled in such a manner as to be fitted into the recess 130. A bottom face of the recess 130 is a supporting surface 134 that supports the packing material 56 from below. Also, an upper end opening part of the support member 52 is swaged inward and becomes an engagement part 136 that supports an outer peripheral edge part of the packing material 56 from above.

An inner peripheral edge part of the packing material 56 is supported from above by a flange portion 138 that protrudes radially outward on a lower portion of the body 42. A sealing surface 140 of the packing material 56 is exposed to between the engagement part 136 and the flange portion 138. The valve element 44 touches and leaves the valve seat 28 on the sealing surface 140. Since the packing material 56 is made of a material that swells on exposure to the refrigerant, an appropriate clearance (backlash) is provided, in a radial direction, between the packing material 56 and the recess 130. Provision of such clearance can absorb the amount of expansion in the event the packing material 56 swells.

A ring-shaped flow passage 142, which is circularly open on the supporting surface 134, is formed in the support member 52. Also, a communicating path 144, which is used to communicate between this ring-shaped flow passage 142 and the valve chamber 38, is provided in the support member 52. The communicating path 144 extends from the ring-shaped flow passage 142 in a radial direction and is open on a side surface of the support member 52. The ring-shaped flow passage 142 and the communicating path 144 each functions as a "fluid flow passage" that is used to ensure the flow of refrigerant between a side surface of the packing material 56 opposite to the sealing surface 140 (i.e., a contact face of the packing material 56 with the supporting surface 134) and the valve chamber 38. It is to be noted here that the ring-shaped flow passage 142 is open farther radially outward than a position where the packing material 56 touches and leaves the valve seat 28 (see a dashed-dotted line in FIG. 3) and is open more radially inward than a tip end position of the engagement part 136 (see a dashed-two dotted line in FIG. 3).

Similarly, as shown in FIG. 5B, an annular recess 150, into which the packing material 58 is fitted, is formed on the bottom face of the support member 52. The inside diameter and the outside diameter are larger than the inside diameter and the outside diameter of the recess 130, respectively. The packing material 58 has an annular shape that is substantially complementary to the shape of the recess 150, and is assembled in such a manner as to be fitted into the recess 150. A bottom face of the recess 150 is a supporting surface 154 that supports the packing material 58 from above. Also, a lower end opening part of the support member 52 is swaged inward and becomes an engagement part 156 that supports a peripheral edge part of the packing material 58 from below.

An inner peripheral edge part of the packing material 58 is supported from below by the guide member 54. A sealing surface 160 of the packing material 58 is exposed to between the engagement part 156 and the guide member 54. The valve element 44 touches and leaves the valve seat 36 on the sealing surface 160. Since the packing material 58 is made of a material that swells on exposure to the refrigerant, an appropriate clearance is also provided, in a radial direction, between the packing material 58 and the recess 150.

A ring-shaped flow passage 162, which is circularly open on the supporting surface 154, is formed in the support member 52. Also, a communicating path 164, which is used to communicate between this ring-shaped flow passage 162 and the valve chamber 38, is provided in the support member 52. The communicating path 164 extends from the ring-shaped flow passage 162 in the direction of axis line and is open on a side surface of the support member 52. The ring-shaped flow passage 162 and the communicating path 164 each functions as a "fluid flow passage" that is used to ensure the flow of refrigerant between a side surface of the packing material 58 opposite to the sealing surface 160 (i.e., a contact face of the packing material 58 with the supporting surface 154) and the valve chamber 38. It is to be noted here that the ring-shaped flow passage 162 is open farther radially outward than a position where the packing material 58 touches and leaves the valve seat 36 (see a dashed-dotted line in FIG. 3) and is open more radially inward than a tip end position of the engagement part 156 (see a dashed-two dotted line in FIG. 3).

The valve element 44 configured as above is assembled as shown in FIG. 4. In other words, the packing material 56 is first fitted into the recess 130 of the support member 52 and then the upper end opening part of the support member 52 is swaged inward so as to fix the packing material 56. Also, the packing material 58 is fitted into the recess 150 of the support member 52 and a lower end opening part of the support member 52 is swaged inward so as to fix the packing material 58 (see a dashed-line arrow in FIG. 4). An assembling body and the guide member 54, which both have been obtained as above, are sequentially assembled in such a manner as to be inserted around the body 42 from below, and then a low end opening part of the body 42 is swaged outward so as to fix the assembling body and the guide member 54 (see solid arrow in FIG. 4).

The above-described supporting structures for the packing materials 56 and 58 function as the fall prevention structures for the respective packing materials. In other words, by employing the above-described fall prevention structures, the fluid flow passage comprised of the ring-shaped flow passage 142 and the communicating path 144 is formed in the support member 52. Thereby, a side of the packing material 56 opposite to the sealing surface 140 is constantly communicated with the upstream passage, and this state of constantly communicating with each other remains in effect. This makes it difficult for the pressure difference to work on the top and the bottom face of the packing material 56. As a result, no force sufficient to separate the packing material 56 from the recess 130 occurs. Hence, the packing material 56 can be prevented from falling off from the support member 52.

In more detail, since the upstream-side pressure P1 (high pressure) acts on the sealing surface 140 of the packing material 56, too, at the time the first valve section is closed as shown in FIG. 3, the pressures on the top face and the bottom face of the packing material 56 are generally remained well-balanced. Besides, the packing material 56 is subjected to a pressing force from the valve seat 28 and therefore the packing material 56 will not fall off from the recess 130. When, on the other hand, the open/close status of the first valve section transits from "closed" to "open", the valve seat 28 gets spaced apart from the packing material 56 and the pressure acting on the sealing surface 140 drops rapidly. At the same time, however, the pressure acting on the side surface (back side) of the packing material 56 opposite to the sealing surface 140 thereof is also promptly reduced via the fluid flow passage. Hence, no force sufficient to separate the packing material 56 from the recess 130 occurs. In other words, provision of the fluid flow passage can release a high-pressure refrigerant, which has entered a gap between the packing material 56 and the support member 52 (namely, the residual pressure due to the high-pressure refrigerant can be eliminated quickly). This can prevent the packing material 56 from falling off from the support member 52. Such operation and advantageous effects as described above can be similarly achieved for the packing material 58, too, at the time the second valve section is opened/closed but the repeated description thereof is omitted here.

Figure 6A:
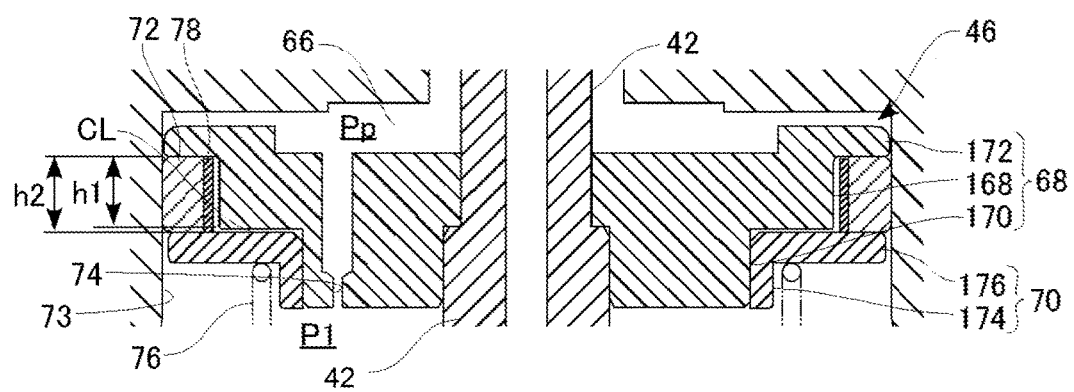
FIGS. 6A and 6B are each a partially enlarged view of a seal structure in a piston of a driven member.
Figure 6B:
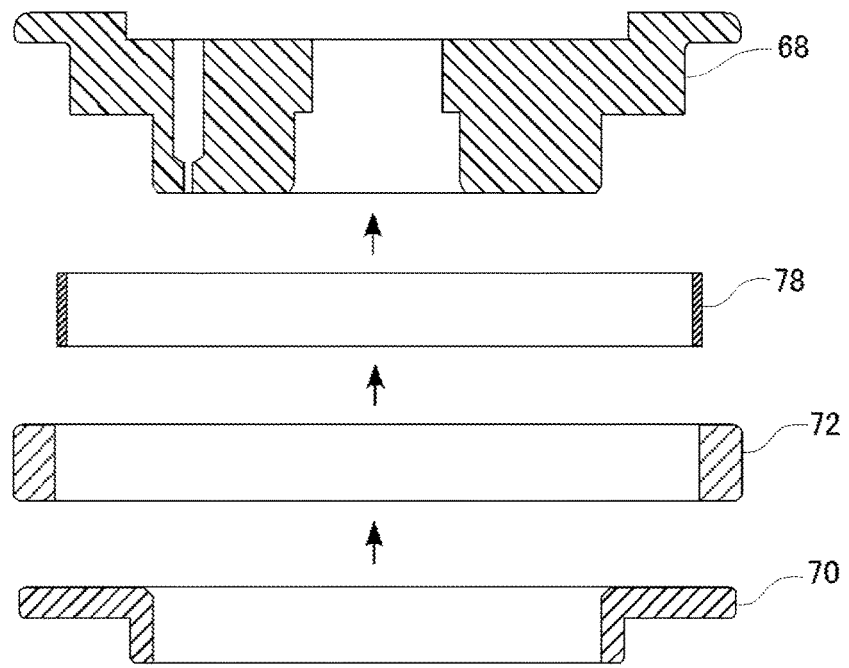
Figure 7A:
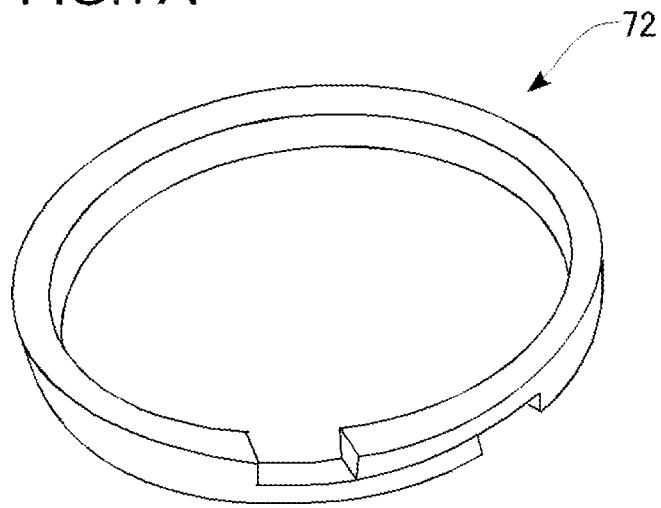
FIGS. 7A and 7B are each a perspective view showing a structure of a component of a piston.
Figure 7B:
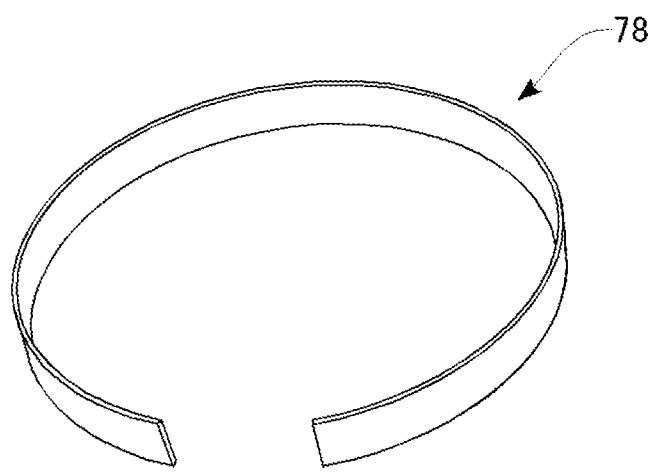

FIGS. 6A and 6B are each a partially enlarged view of a seal structure in a piston of a driven member. FIG. 6A shows a structure around the piston, and FIG. 6B shows a process of assembling the piston. FIGS. 7A and 7B are each a perspective view showing a structure of a component of the piston. FIG. 7A shows a piston ring, and FIG. 7B shows a tension ring.

As shown in FIG. 6A, the piston 46 is configured such that the piston ring 72 is held between the piston body 68 and the support 70. The piston body 68 has a larger-diameter part 168, around which the piston ring 72 is inserted, and a smaller-diameter part 170, around which the support 70 is inserted. A flange portion 172 is formed connectedly on an upper portion of the larger-diameter part 168. Also, the support 70 has a ring-shaped body 174, which is inserted around the smaller-diameter part 170, and a flange portion 176, which extends radially outward from an upper portion of the body 174. An upper end of the spring 76 is supported by the flange portion 176. When the piston 46 is to be assembled, the tension ring 78, the piston ring 72 and the support 70 are sequentially assembled relative to the piston body 68, as shown in FIG. 6B.

As shown in FIG. 6A, a height h1 of the larger-diameter part 168 is slightly smaller than a height h2 of the piston ring 72. The height of the tension ring 78 is slightly smaller than the height h2 of the piston ring 72. As a result, a predetermined clearance CL is formed between the piston body 68 and the support 70, in the direction of axis line. Provision of the clearance CL allows the piston ring 72 to reliably abut against the flange portion 172 on an upper end surface of the piston ring 72 and allows the piston ring 72 to reliably abut against the flange portion 176 on a lower end surface thereof. In other words, the piston ring 72 is reliably held by the piston body 68 and the support 70.

As shown in FIG. 7A, the piston ring 72 is ring-shaped such that one end thereof in the peripheral direction is engaged with the other end thereof in the peripheral direction. Thereby, the piston ring 72 is configured such that it is deformable in the radial direction by up to a predetermined amount. As shown in FIG. 7B, the tension ring 78 has a C-shape cross section and is constituted by a plate spring that generates a biasing force radially outward. When the piston 46 having configured as described above is assembled as shown in FIG. 6A, the tension ring 78 presses the piston ring 72, from within, radially outward. This creates an appropriate sliding force in between the piston ring 72 and the guiding passage 73.

Figure 8:
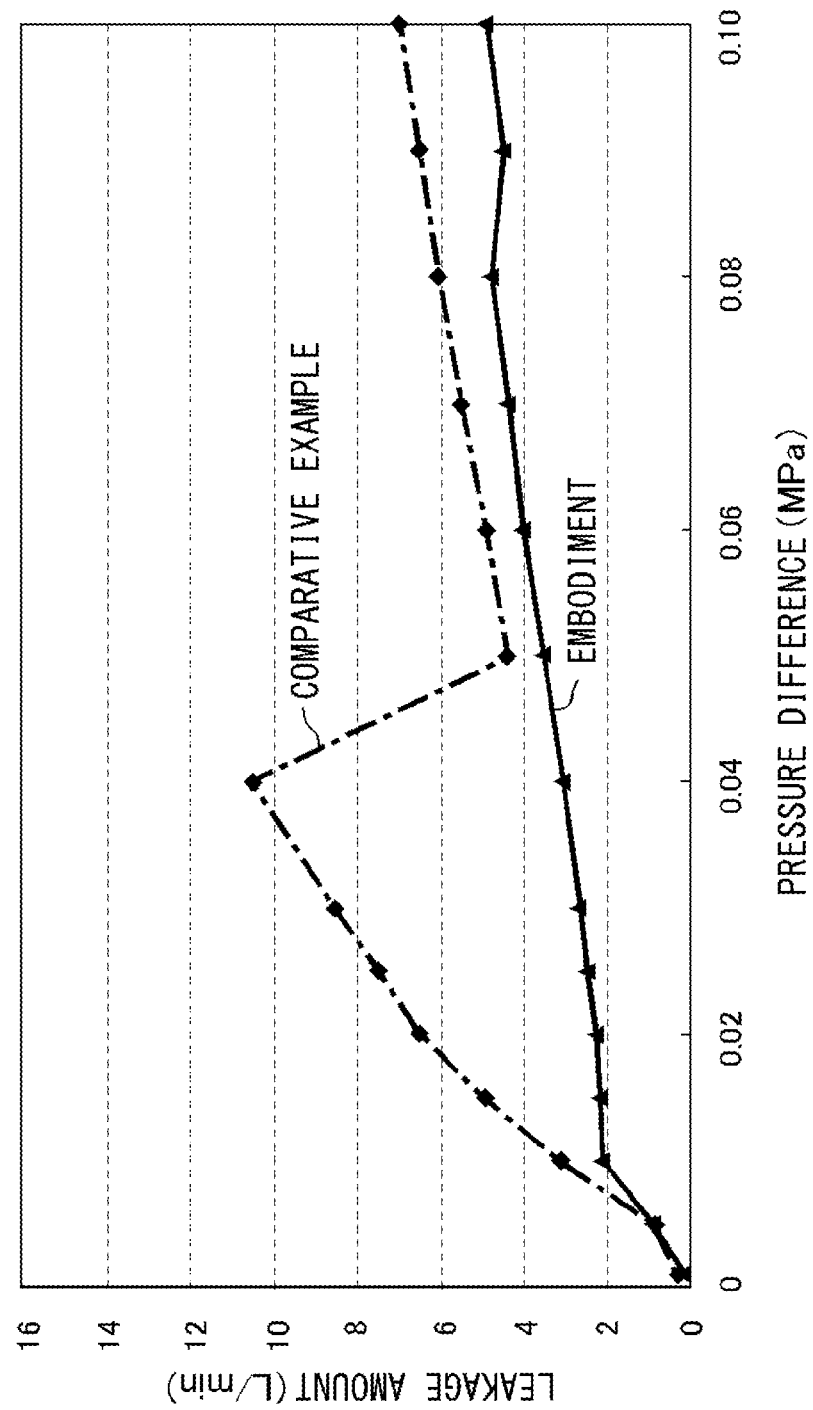
FIG. 8 is a graph showing an operation and advantageous effects of a seal structure in a piston.

FIG. 8 is a graph showing an operation and advantageous effects of a seal structure in a piston. The horizontal axis of FIG. 8 indicates a pressure difference ΔP acting on the piston 46 (i.e., the pressure difference (P1−Pp) between the high-pressure chamber 64 and the back pressure chamber 66). And the vertical axis thereof indicates a leakage amount of refrigerant from the high-pressure chamber 64 toward the back pressure chamber 66 through a gap between the piston 46 and the guiding passage 73. The solid line in FIG. 8 indicates a result of the present embodiment, whereas the dashed-dotted line therein indicates a result of a comparative example. The comparative example is of a conventional structure such that the piston is not divided into the piston body and the support.

By employing the present embodiment, the piston 46 is configured as described above, so that, as shown in FIG. 8, the leakage amount of refrigerant can be significantly reduced in a domain where the pressure difference ΔP is small to a domain where the pressure difference ΔP is large. In contrast to the present embodiment, the amount of refrigerant in the comparative example is large in the domain where the pressure difference ΔP is small. This may be deduced for the following reasons. That is, as shown in FIG. 6A, the present embodiment is configured such that the piston 46 is divided into the piston body 68 and the support 70, such that the piston ring 72 is held between the piston body 68 and the support 70, and such that a clamping force by which the piston ring 72 is held therebetween can be obtained by not only the pressure difference (P1−Pp) but also the biasing force of the spring 76. Thus, even when, in particular, the pressure difference (P1−Pp) is small, the top face and the bottom face of the piston ring 72 can be firmly attached to the piston body 68 and the support 70, respectively. This suppresses the leakage of refrigerant through a gap in the fitting space of the piston ring 72 in the piston 46.

In contrast, the clamping force as in the present embodiment cannot be obtained for the piston ring in the comparative example. Thus, the piston ring in the comparative example is loosely fit when, in particular, the pressure difference (P1−Pp) is small. As a result, the refrigerant is more likely to leak in the comparative example through a gap or gaps of a fitting space. In other words, the present embodiment is of such a structure that the problem like this in the comparative example can be resolved.

Figure 9A:
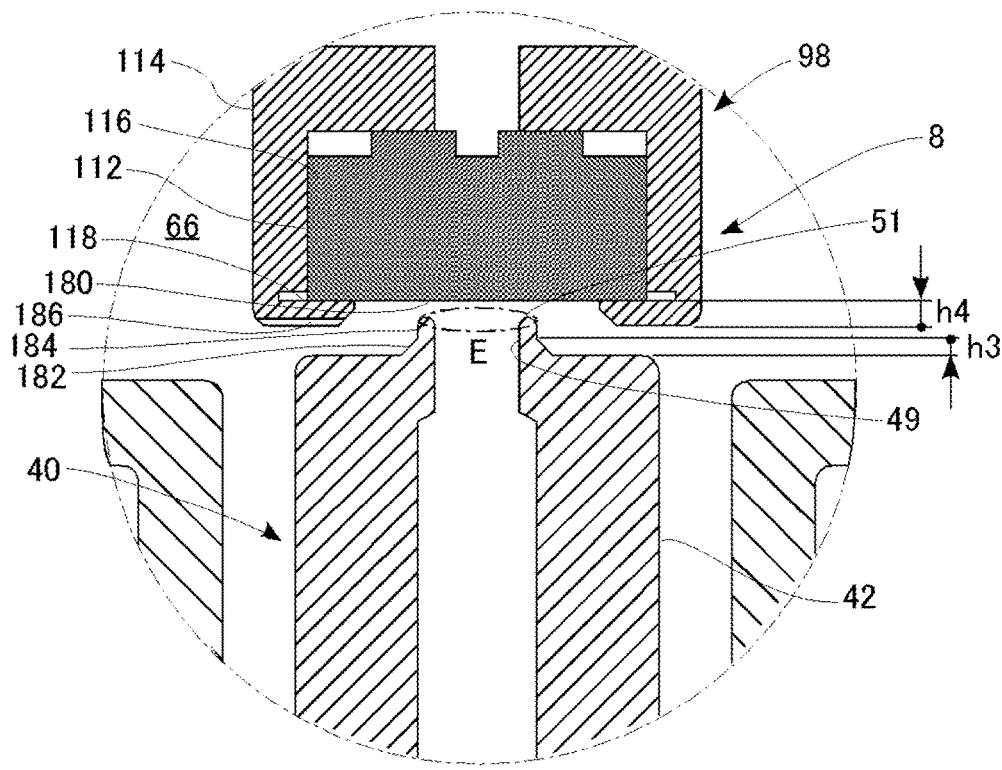
FIGS. 9A and 9B are each a partially enlarged view showing a stopper structure in a pilot valve.
Figure 9B:
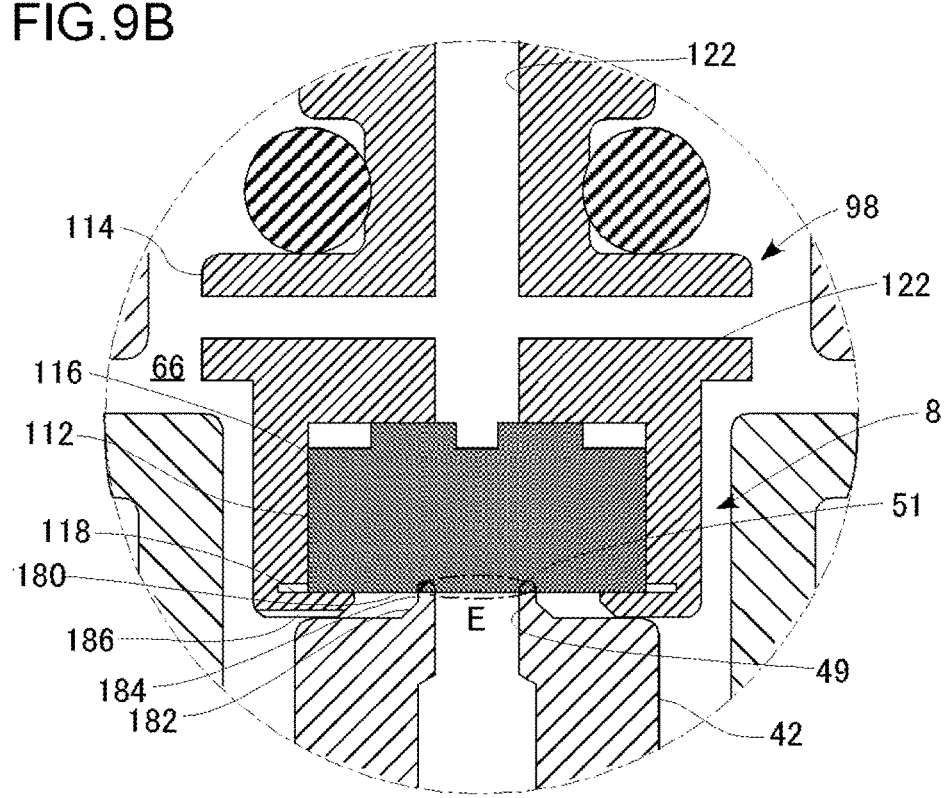

FIGS. 9A and 9B are each a partially enlarged view showing a stopper structure in a pilot valve. FIG. 9A shows a state where the pilot valve is open (see a dashed-dotted circle in FIG. 1), and FIG. 9B shows a state where the pilot valve is closed (see a dashed-dotted circle in FIG. 2).

As shown in FIG. 9A, a lower end opening part of the valve formation part 114 is swaged inward in the pilot valve element 98, thereby constituting the stopper 118. The stopper 118 supports, from below, an outer peripheral edge part of the sealing member 112 contained in the fitting space 116. A sealing surface 180 of the sealing member 112, which is exposed on an underside thereof, touches and leaves the pilot valve seat 51 so as to close and open the pilot valve 8, respectively. After the sealing member 112 has started seating on the pilot valve seat 51, the stopper 118 is stopped by an upper end surface of the body 42 and thereby the displacement of the pilot valve element 98 caused by the deformation of the sealing member 112 is restricted.

The pilot valve seat 51 having a circular boss shape is formed, in a protruding manner, on a central part of the upper end surface of the body 42. The pilot valve seat 51 is configured such that a part thereof from the upper end surface of the body 42 to a height h3 is a tapered portion 182 where the cross section thereof is gradually reduced upward. And the pilot valve seat 51 is configured such that the upper portion thereof above the tapered portion 182 is an attaching/detaching portion 184 whose cross section is constant (the outside diameter is constant). In this configuration as described above, a height h4 of the stopper 118 is set larger than the height h3 of the tapered portion 182. As shown in FIG. 9B, this configuration allows the sealing surface 180 of the sealing member 112 not to reach the tapered portion 182 at the time the pilot valve 8 is closed. In other words, the sealing member 112 has flexibility and therefore the pilot valve seat 51 bites in the sealing member 112, which is elastically deformably pressed by the pilot valve seat 51, when the pilot valve 8 is closed; however, the degree to which the pilot valve seat 51 bites in the sealing member 112 can be set within an extension range of the attaching/detaching portion 184. As a result, a pressure-receiving diameter E of the pilot valve element 98 can be constantly set equal to the outside diameter of the attaching/detaching portion 184.

Further, a plurality of communicating paths 186 are formed, at predetermined intervals, in a circumferential direction on a bottom face of the stopper 118. The communicating paths 186, which are so provided as to extend in a radial direction, communicate between a space, surrounded by the stopper 118 and the pilot valve seat 51, and the back pressure chamber 66, when the stopper 118 is stopped by the body 42 as shown in FIG. 9B. Such configuration and arrangement as described above allow the pressure-receiving diameter E of the pilot valve element 98 to remain constant from the start when it abuts against the pilot valve seat 51 until when it is stopped.

As described above, the configuration and arrangement of the stopper 118 and the pilot valve seat 51 are devised. This can accurately set the amount of displacement developed by the pilot valve element 98 in closing the pilot valve 8. As a result, the magnetic gap between the core 80 and the plunger 84 at the time the valve is closed can remain constant. Also, the pressure-receiving diameter E of the pilot valve element 98, when it seats on the pilot valve seat 51, can remain constant. This can prevent the occurrence of noise caused when the core 80 and the plunger 84 hit each other. Also, the value of current supplied to the solenoid 4, which is required to close not only the pilot valve 8 but also the second valve section can be kept constant and therefore the control performance of the solenoid 4 is stabilized.

The description of the present invention given above is based upon illustrative embodiments. These embodiments are intended to be illustrative only and it will be obvious to those skilled in the art that various modifications could be further developed within the technical idea underlying the present invention.

Figure 10A:
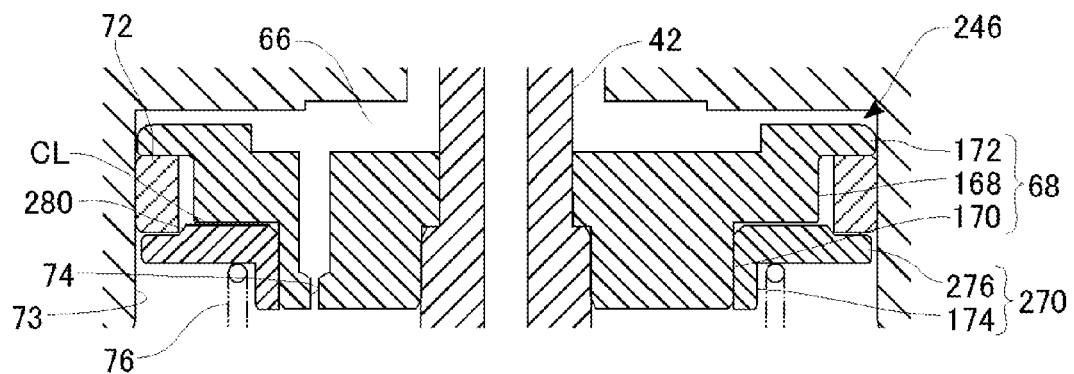
FIGS. 10A and 10B are each a partially enlarged view showing a structure of a seal structure in a piston of a driven member according to a modification.
Figure 10B:
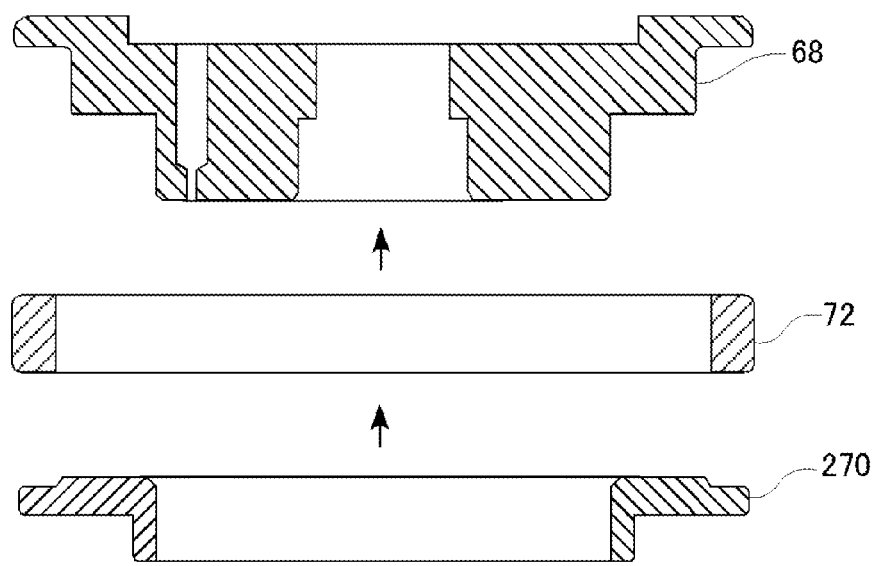

FIGS. 10A and 10B are each a partially enlarged view showing a structure of a seal structure in a piston of a driven member according to a modification. FIG. 10A shows a structure around the piston, and FIG. 10B shows a process of assembling the piston.

In the present modification, the shape of a support 270 is so devised that the tension ring 78 shown in FIGS. 6A and 6B is omitted. In other words, a tapered surface 280 is formed on a flange portion 276 of the support 270, and the support 270 is brought close to the piston body 68; thereby, the piston 246 is configured such that a biasing force in a radially outward direction is applied to the piston ring 72 by the tapered surface 280. In this modification, too, a predetermined clearance CL is formed between the piston body 68 and the support 270, in the direction of axis line. When the piston 246 is to be assembled, the tension ring 78, the piston ring 72 and the support 270 are sequentially assembled relative to the piston body 68, as shown in FIG. 10B. By employing the configuration and arrangement according to the present modification, the leakage amount of refrigerant can be significantly reduced over the domain where the pressure difference $\Delta P$ is small to large.

In the above-described embodiments, the material that constitutes the packing materials 56 and 58 (sealing members) is rubber. The material constituting the sealing member 112 is rubber as well. In a modification, other flexible materials, such as polytetrafluoroethylene (PTFE), may be used. In the above-described embodiments, the material constituting the body 42 of the driven member 40 is made of an aluminum alloy, and the material constituting the body 110 of the pilot valve element 98 is made of stainless steel (SUS). In a modification, both the body 42 thereof and the body 110 thereof may be made of the same material. In that case, the same material constituting both of them may be an aluminum alloy or stainless steel, or a material including another metal or the like may be used. In the above-described embodiments, the material constituting the piston ring 72 is made of polytetrafluoroethylene (PTFE) but, instead, a material including other resin materials, carbon, metal or the like may be used.

In the above-described embodiments, the description has been given of an example where the ring-shaped flow passages 142 and 162 are formed in the support member 52. In a modification, the ring-shaped flow passage 142 may be provided in the packing material 56 and may communicate with the communicating path 144 provided in the support member 52. Similarly, the ring-shaped flow passage 162 may be provided in the packing material 58 and may communicate with the communicating path 164 provided in the support member 52.

In the above-described embodiments, the description has been given of an example where the ring-shaped flow passages 142 and 162 are each formed in a single circular shape. Instead, an intermittent (discontinuous) flow passage may be arranged circularly along a virtual circle. In that case, a communicating path is provided in each flow passage and is made to communicate with the valve chamber 38.

In the above-described embodiments, the description has been given of an example where the packing materials 56 and 58 (sealing members) are swaged and joined to the support member 52 and where the sealing member 112 is swaged and joined to the valve formation part 114. In a modification, at least one or some of the sealing members may be clamped using screws, for instance, and may be joined using a means and/or process other than the swaging.

In the above-described embodiments, the description has been given of an example where the configuration and arrangement are such that the stopper 118 is provided at the tip of the pilot valve element 98 and is stopped by the driven member 40. In a modification, the stopper 118 may be stopped by other members such as the third body 13. Also, the stopper may be provided in a middle part of the pilot valve element 98 in a longitudinal direction and may be stopped by the core 80 or the third body 13. In that case, too, it is presupposed that the sealing member 112 touches and leaves the pilot valve seat 51 within the extension range of the attaching/detaching portion 184.

In the above-described embodiments, the description has been given of an example where the control valve 1 is configured as a three-way valve having two lead-out ports for a single lead-in port. Instead, the control valve 1 may be configured as a two-way valve, for example, having one lead-out port for a single lead-in port. Or alternatively, the control valve 1 may be configured as a four-way valve having two lead-out ports for two lead-in ports. The valve element where the sealing member is fitted may be provided upstream of the valve section, similarly to the above-described embodiments.

In the above-described embodiments, the description has been given of an example where the control valve 1 is configured as an electromagnetic valve provided with the solenoid that functions as an actuator for electrically regulating the opening degree of the valve section from the outside. Instead, the control valve 1 may be configured as other electrically driven valves, such as a motor-operated valve provided with a motor that functions as the actuator, for instance. Also, a description has been given of an example where the control valve according to the preferred embodiments is applied to an air conditioner of an electric-powered vehicle but it goes without saying that the control valve is applicable to an air conditioner of a vehicle provided with an internal-combustion engine and an air conditioner of a hybrid vehicle equipped with both an internal-combustion engine and an electric motor drive. Further, the control valve according to the preferred embodiments is applicable to not only the vehicles but also any apparatuses and devices equipped with the electrically driven valve. Also, the control valve according to the preferred embodiments is applicable to an apparatus or system where a fluid, such as water or oil, other than the refrigerant flows is applicable.

The present invention is not limited to the above-described embodiments and modifications only, and those components may be further modified to arrive at various other embodiments without departing from the scope of the invention. Also, various other embodiments may be further formed by combining, as appropriate, a plurality of structural components disclosed in the above-described embodiments and modification. Also, one or some of all of the components exemplified in the above-described embodiments and modifications may be left unused or removed.

What is claimed is:
1. A pilot operated electromagnetic valve comprising:
a body having a lead-in port through which a fluid is led in, a lead-out port through which the fluid is led out, and a main passage joining the lead-in port to the lead-out port;
a metallic driven member integrally formed with both a main valve element and a partition, wherein the main valve element opens and closes a main valve by touching and leaving a main valve seat provided in the main passage and wherein the partition separates the main passage from a back pressure chamber;

a pilot valve element that opens and closes a pilot valve by touching and leaving a pilot valve seat, the pilot valve seat being provided in a sub-passage joining the lead-in port to the lead-out port by way of the back pressure chamber; and a solenoid including a first iron core, which is displaced integrally with the pilot valve element in a direction of axis line, and a second iron core, which faces the first iron core in the direction of axis line, wherein a pilot passage is formed in such manner as to pass through the driven member, the pilot valve seat is provided at one end side of the pilot passage such that the pilot valve seat protrudes toward the back pressure chamber, and the other end of the pilot passage communicates with the lead-out port, wherein the pilot valve element includes:

a metallic pilot valve body formed integrally with the first iron core;

a flexible sealing member, fitted on a tip of the pilot valve body, which touches and leaves the pilot valve seat; and a stopper for restricting a displacement of the pilot valve element relative to the driven member in a manner such that the stopper is stopped in the direction of axis line after the flexible sealing member has seated on the pilot valve seat, wherein the stopper is configured such that a pressure-receiving diameter defined by an attaching/detaching portion of the pilot valve seat when pressed into the flexible sealing member, which receives a pressure difference between an upstream side and a downstream side of the pilot valve, remains unchanged from when the flexible sealing member comes in contact with the pilot valve seat until when the flexible sealing member has completely seated on the pilot valve seat with the result that the stopper is stopped by the driven member, and wherein a communicating path, which communicates between a space, surrounded by the stopper and the pilot valve seat, and the back pressure chamber, is formed when the stopper is stopped by the driven member.

2. An electromagnetic valve according to claim 1, wherein the stopper is provided at a tip of the pilot valve body and is stopped by the driven member.

* * * * *